INVENTOR
WALLACE E. BRAINARD
ATTORNEY
William C. Gleisner Jr.

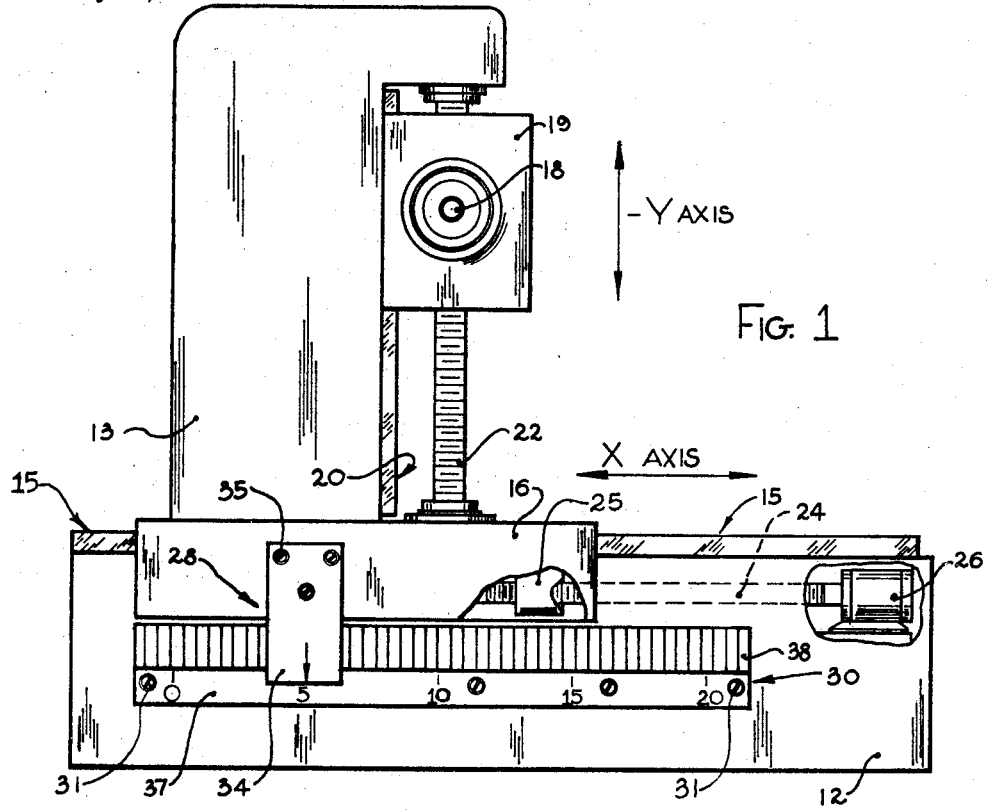

Jan. 20, 1970  W. E. BRAINARD  3,491,277
THERMAL COMPENSATION SYSTEM FOR POSITION TRANSDUCERS
Filed May 24, 1967  5 Sheets-Sheet 4
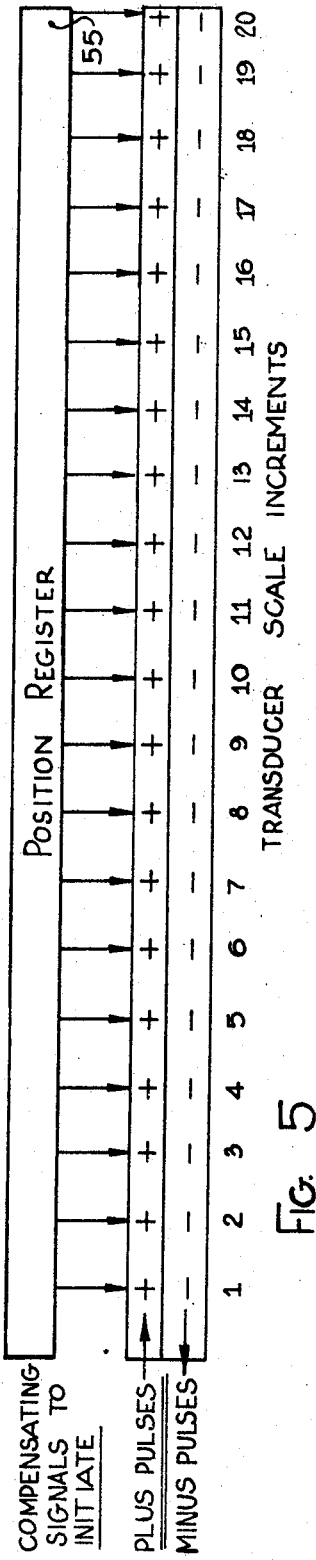
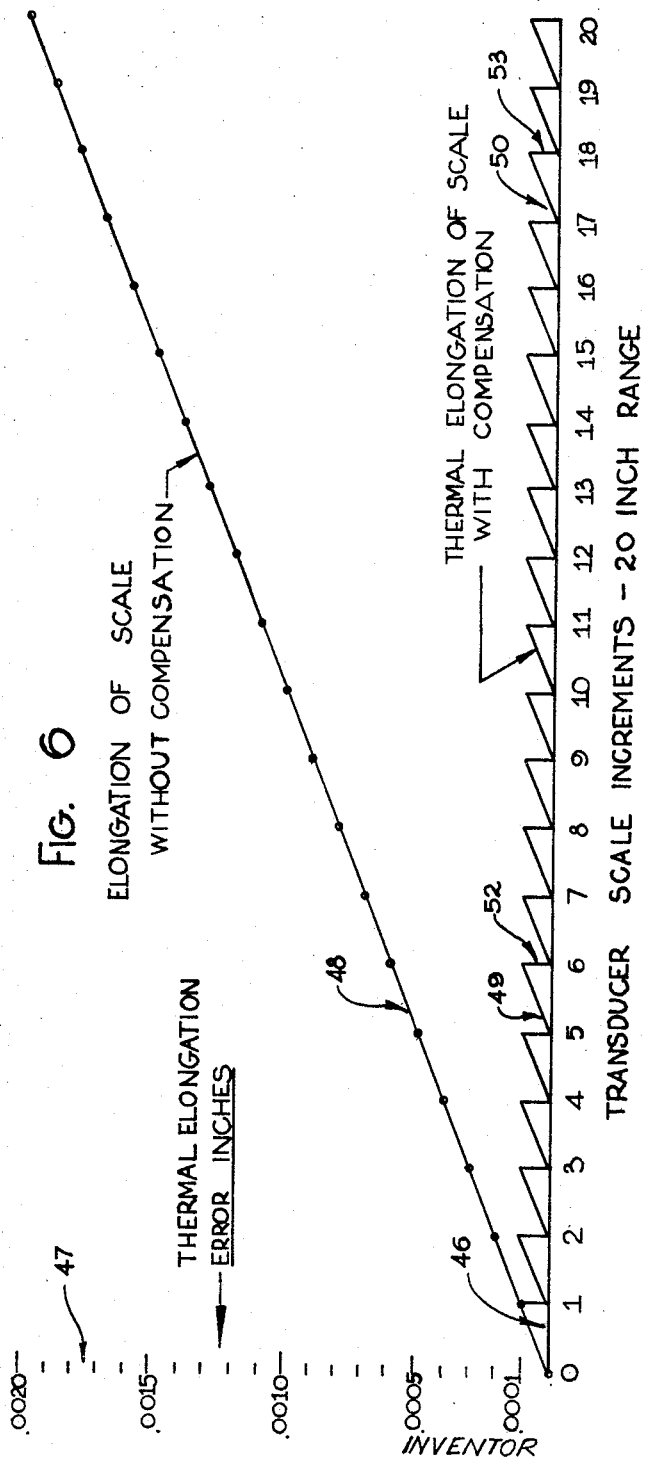
INVENTOR
WALLACE E. BRAINARD
ATTORNEY
William C. Gleisner Jr.

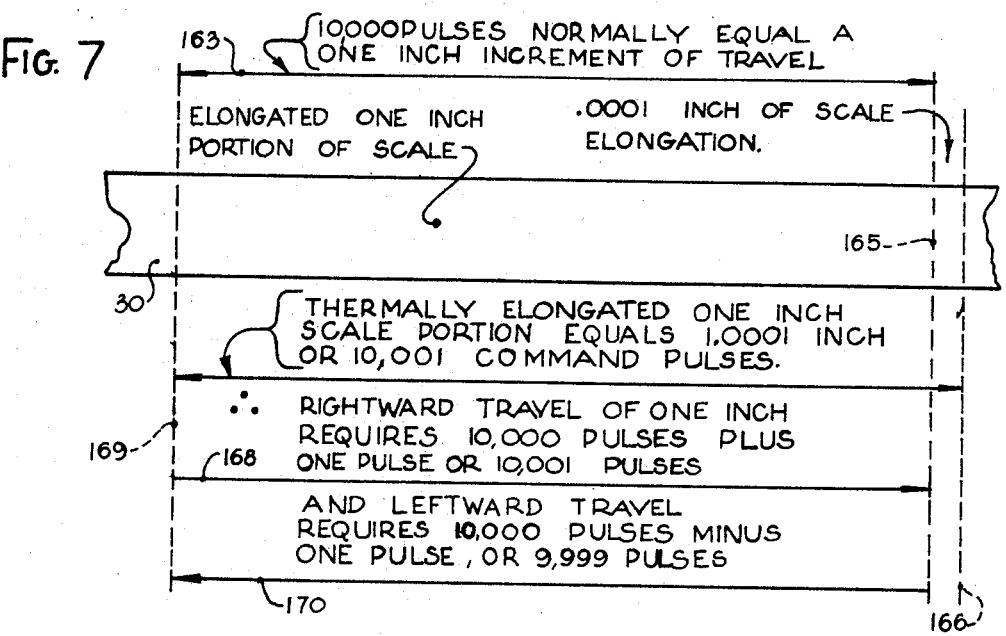
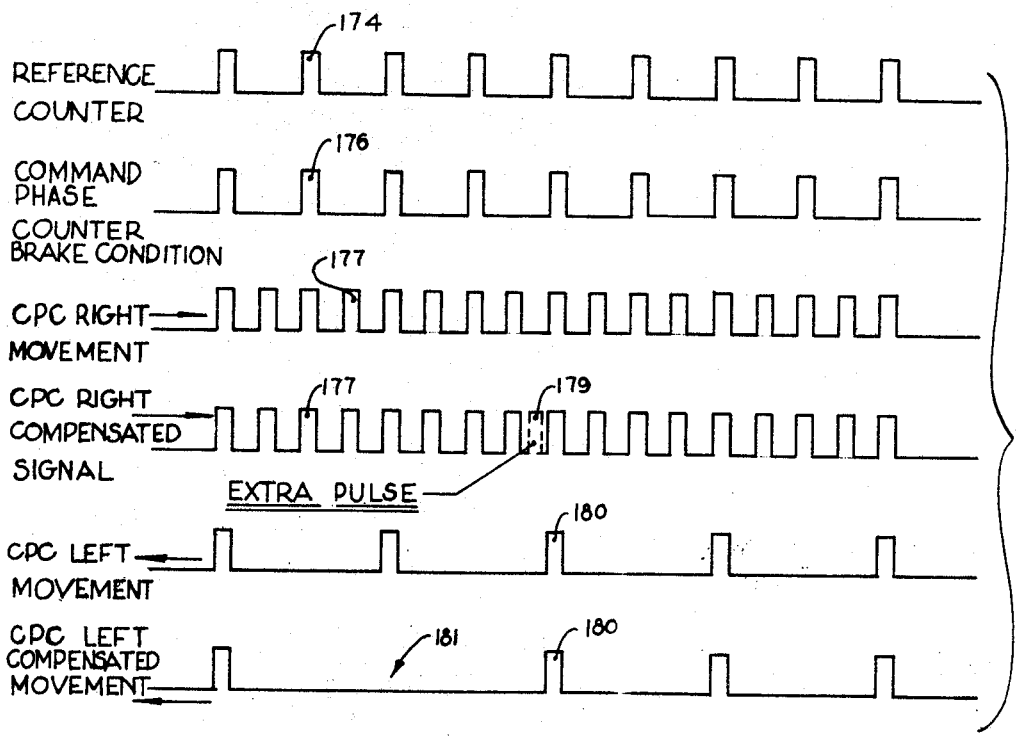
FIG. 8
COMMAND PULSE TIMING CHART
INVENTOR.
WALLACE E. BRAINARD

United States Patent Office 3,491,277
Patented Jan. 20, 1970

3,491,277
THERMAL COMPENSATION SYSTEM FOR POSITION TRANSDUCERS
Wallace E. Brainard, New Berlin, Wis., assignor to Kearney & Trecker Corporation, West Allis, Wis., a corporation of Wisconsin
Filed May 24, 1967, Ser. No. 640,973
Int. Cl. H02p 1/54
U.S. Cl. 318—18                                    5 Claims

ABSTRACT OF THE DISCLOSURE

Certain transducers comprise a measuring scale and a cooperating, movable sensor in combination with a servo drive connected to effect relative movement therebetween in response to command data. Positional indicating feedback signals from the transducer control the servo drive to effect accurate, discrete positioning movement in accordance with the command data. Consequently, any distortion in the transducer scale, which may be thermally induced, results in corresponding inaccuracies in the control of positioning movements. The present invention comprises a signal modifier connected to predeterminately modify the positional command signals from the command data to compensate for thermal expansion of the transducer scale. The arangement is such that the positional command signals are modified at uniformly repetitive increments of movement irrespective of the direction and thereby reduce positional errors.

---

This invention relates to an electrical compensating system for modifying a positional control signal in a numerical control system for a machine tool.

A principal object of this invention is to provide an electrical error compensator for a numerical control system of a machine tool.

Another object of the invention is to provide an auxiliary signal controller operable to compensate for thermal distortion in the cooperatively associated parts of a machine tool.

Another object of the invention is to provide a signal modifier predeterminately operative to modify a positional command signal from a numerical control system.

A further object of the invention is to provide in combination with a positional command numerical control system an electrical signal modifier predeterminately operative to provide signals for modifying positional command signals.

A still further object of the invention is to provide signal modifying means to compensate for thermal distortion in a lineal transducer that is operative to indicate discrete positional movement of a movable member.

According to this invention, a numerical control system operable to effect predetermined relative movement between a pair of machine members is provided with an automatically operative electrical signal modifier. To effect relative movement, a screw and nut translating mechanism interconnected between the pair of machine members is driven by a servomotor responsive to the numerical control system. To actuate the servomotor for effecting directionally controlled relative movement between the members, command data from a medium such as punched tape operates the numerical control system to supply positional command signals. For controlling the extent of movement between the relatively movable members, a transducer connected therebetween provides a feedback control signal to operate the servomotor in accordance with predeterminately modified positional command signals from the numerical control system. In accordance with an actual measurement of thermally induced distortion occurring between the relatively movable members, a signal modifier is connected to provide predetermined modifying signals to compensate for such distortion. During subsequent predetermined increments of relative movement between the members, the signal modifier is connected to automatically supply the preselected compensating signals to the numerical control system for providing the required modified positional command signals. During numerically controlled movement, therefore, the modified positional command signal from the numerical control system is operative to compensate for positional distortion occurring during each increment of relative movement, as well as the cumulative distortion occurring during the total range of successive increments of movement.

The foregoing and other objects of the invention which will become more fully apparent from the following description of the control system and machine tool herein illustrated may be achieved by the embodiments described herein and illustrated in the accompanying drawings, in which:

FIG. 1 is a view in front elevation of a machine tool incorporating the invention;

FIG. 1A is an enlarged, fragmentary plan view of the transducer measuring scale;

FIG. 2 is a timing chart illustrating pulses for controlling velocity;

FIG. 5 is a graphic representation of the positive and minus corrective pulses initiated by the position register;

FIG. 6 is a fragmentary schematic view illustrating the successive uniform increments at which corrective pulses are provided;

FIG. 7 is a comparative chart illustrating thermal expansion of a one inch portion of the transducer scale and the resulting compensating command pulses for effecting movement; and, FIG. 8 is a schematic view of a command pulse timing chart for controlling positional movement.

Figure 3:
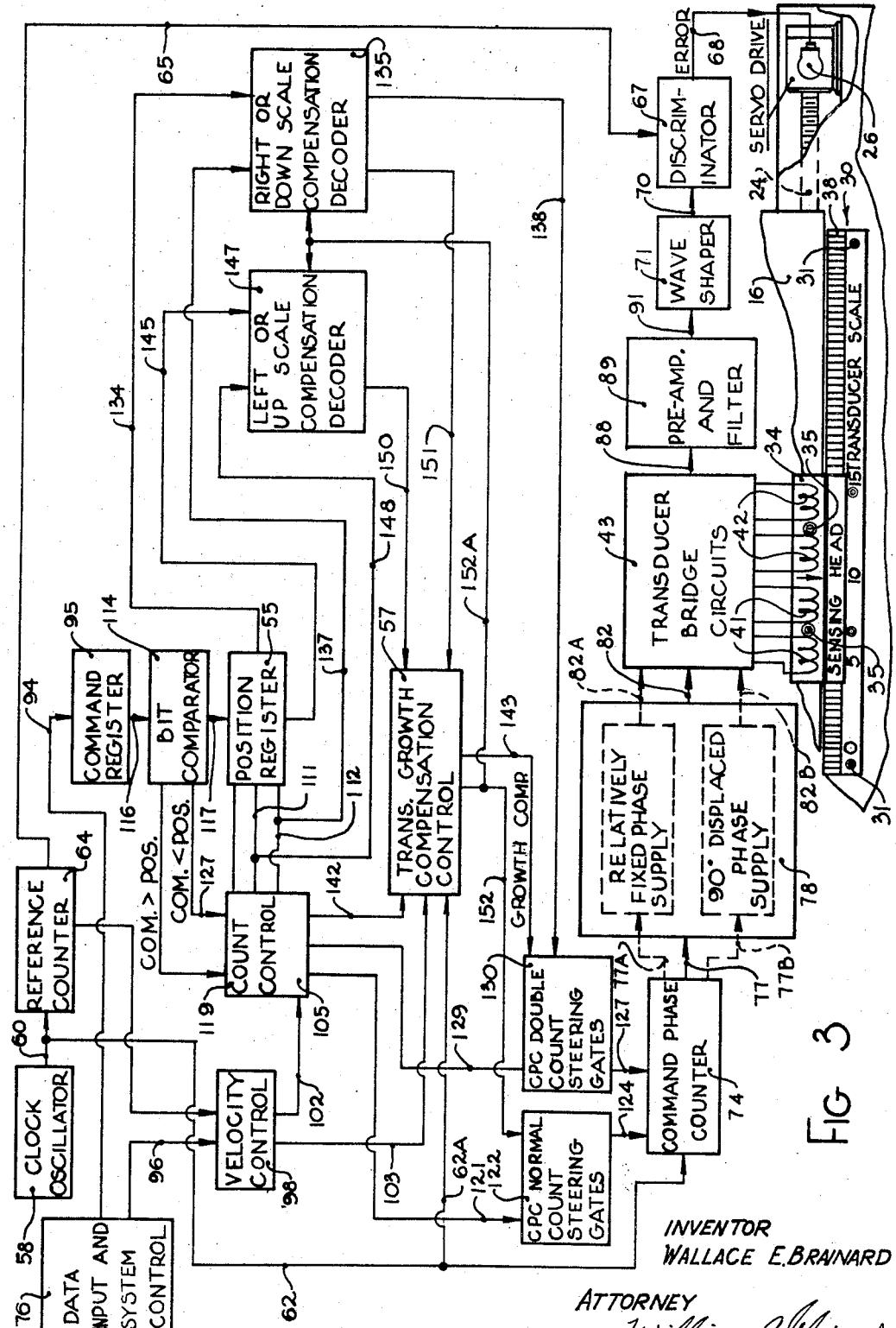
FIG. 3 is a block diagram of a numerical control system incorporating the invention in combination with the movable machine member driven thereby.

Referring to the drawings, there is schematically represented in FIG. 1 a machine tool having a horizontally extending bed 12 and a vertical upright or column 13 secured thereto for constituting a support frame. Horizontal ways 15 presented by the upper portion of the bed 12 are disposed to slidably support a worktable 16 for horizontal movement therealong. The usual gibs (not shown) are arranged in well-known manner to retain the worktable 16 in slidable engagement with the horizontal ways 15.

A rotatable tool receiving spindle 18 is journaled to rotate in a spindle head 19 mounted for vertical sliding movement along vertical ways 20 presented by the column upright 13. A rotatable elevating screw 22 journaled at its opposite ends in an overhanging portion of the column 13 and bed 12 engages a cooperating nut (not shown) carried by the spindle head 19 to effect vertical movement thereof. The usual power drives (not shown) are respectively connected to rotate the tool spindle 18 at selected rate, and to rotate the elevating screw 22 for effecting vertical movement of the spindle head 19.

Thus, to perform machining operations, the tool spindle 18 is selectively movable along a vertical Y axis relative to a workpiece (not shown) secured to the worktable 16 which is horizontally movable along an X axis. For moving the worktable 16, an internally threaded nut 25 fixedly secured thereto is threadedly engaged by a rotatable table screw 24 journaled to rotate in the bed 12. A servomotor 26 mounted within the bed 12 is connected to rotate the table screw 24 for moving the worktable 16 at a selected rate and direction of movement along the X axis.

As known in the art, the spindle head 19 may be mounted on a vertically movable saddle (not shown) for horizontal, transverse movement relative to the column 13 and worktable 16 to facilitate performing drilling operations. For accurately controlling the extent of positional movement, separate transducers are interconnected between each adjacent pair of relatively movable members.

Inasmuch as positional control functions in similar manner to control a servomotor drive mechanism, it is deemed necessary to describe only the X axis control transducer 28 interconnected between the bed 12 and worktable 16 carried thereby, as shown in FIG. 1. The particular transducer 28 shown for illustrative purposes in FIGS. 1 and 2 is a type known commercially as "Accupin" that is manufactured and sold by the General Electric Company. Complete operating details of the "Accupin" transducer, such as shown in FIGS. 1 and 2, are fully explained in U.S. Patent No. 3,010,063, entitled "Position Indicating Device" and which issued Nov. 21, 1961. It is particularly emphasized, however, that the position correcting and compensating arrangement of the present invention is not limited to the transducer illustrated in FIG. 1, but can be used with equal advantage in combination with other position controlling transducers. When utilized in combination with a lineal transducer 28, such as illustrated in FIG. 1, predetermined correction signals are arranged to compensate for thermal growth or elongation of both the bed 12 and a lineal scale 30 of the transducer. Further, the position correcting features of the present invention provide equal advantages when used in combination with a rotary transducer, such as a resolver (not shown) having a rotor connected to be rotated by a translating screw relative to a cooperating stator, as known in the numerical machine control art. In the latter case, it will be apparent that the position correcting signals of the present invention would operate to compensate for expansion of the frame, as well as elongation of the lead screw due to thermal distortion of these members during machine operation.

Referring again to FIG. 1, the transducer 28 comprises the rectilinear measuring scale 30 fixedly secured by cap screws 31 to the bed 12, and in position to be partially encompassed by a cooperating sensing device or element 34 secured by cap screws 35 to the worktable 16 for longitudinal movement therewith. The scale 30 comprises a longitudinal clamp 37 within which are secured a plurality of magnetic, cylindrical pins 38 retained in adjacent relationship. The magnetic pins 38 are of identical diameter as shown in an enlarged fragmentary plan view in FIG. 1A, and are one-tenth (.1) of an inch in diameter in a manner that ten (10) pins equal one inch of lineal distance. As shown in FIG. 3, the cooperating sensing device 34 is provided with two pairs of spaced apart coils 41 and 42 connected to receive input command signals from bridge circuits 43 and being, in turn, operative to return thereto feedback control signals for operating the servomotor 26 to control X axis movement. For visually indicating the extent of X axis movement, indicia are provided along the lineal measuring scale 30, including those represented at five, ten, fifteen and twenty inch marks, as shown in FIG. 1. The cooperating sensing device 34 is likewise provided with a scribed arrow indicated as positioned at the five inch scale mark to graphically indicate the positioning of the worktable 16 along the X axis. For moving the worktable 16 a distance of ten inches in a rightward direction, the servomotor 26 is actuated to rotate the translating screw 24 for effecting the selected rightward movement in accordance with the command data. Rightward worktable movement is stopped upon arrival of the sensing device 34 at a predetermined null position with respect to the measuring scale 30, and with the sensing device arrow then being aligned with the fifteen inch scale mark.

Irrespective of the accuracy of numerically controlled positioning of the sensing device 34 along the scale 30, the extent of actual distance traveled depends upon the thermal expansion of the frame and scale. In the event the frame and scale expand longitudinally one ten-thousandth (.0001) of an inch per inch, the accumulative expansion for ten inches would be ten ten-thousandths (.0010) of an inch. In view of the discrete positioning control effected by the electrical coaction between the sensing device 34 and scale 30, the described longitudinal expansion of the scale 30 introduces corresponding errors into servo controlled movement of the worktable 16. With this condition existing, a numerical command signal of ten inches will result in an actual worktable movement of ten inches plus .0010 of an inch, due to the longitudinal scale expansion of .0001 of an inch hereinbefore described for illustrative purposes.

To facilitate describing the invention, a rate of longitudinal expansion of one ten-thousandth (.0001) of an inch per lineal inch has been arbitrarily selected as schematically indicated in FIG. 6. As there shown, the twenty inch range of movement indicated by the horizontal line 46 is shown in relation to the cumulative elongation as indicated by the vertical line 47. Obviously, under some conditions of operation, the rate of expansion or elongation of the measuring scale in response to heat may be considerably less than .0001 of an inch, and in other cases considerably greater than this amount. Further, for illustrative purposes, position compensating command signals of .0001 of an inch are provided incrementally for every lineal inch of travel to compensate for the predetermined described rate of expansion.

In FIG. 6, a continuous angular line 48 graphically indicates the cumulative error for the .0001 per inch expansion in the absence of corrective command signals. The short, symmetrically repetitive, angularly inclined, indivdual lines, such as 49 and 50, illustrate the abortive effect produced by applying corrective compensating signals every lineal inch of travel. Thus, as indicated by the repetitive short vertical lines, such as 52 and 53, corrective command signals of .0001 of an inch compensate for a like expansion or elongation of the measuring scale 30 during predetermined increments of movement, in this case for each successive inch of travel along the X axis.

Assuming a uniform rate of expansion as illustrated in FIG. 6, it will be apparent that corrective command signals to compensate for the expansion can be supplied for other predetermined uniform increments of travel. With the illustrative expansion of .0001 per inch, for example, corrective signals of one-half of a ten-thousandth of an inch can be supplied for each one-half inch; or corrective signals of two-thousandths (.002) of an inch can be provided for each two inches of travel. In either of the foregoing examples, although the error per inch of travel changes, the cumulative correction for twenty (20) inches of travel would be .0020 of an inch, or equivalent to that illustrated in FIG. 6. Likewise, to achieve minimal fluctuations in errors, other properly proportioned compensating signals can be supplied for selective uniform increments of travel less than one-half inch along the measuring scale. In the latter case, it will be obvious that accuracy of the numerical control system could still require signals to compensate for .0001 of an inch elongation of the scale 30, as well as any other predetermined error. Thus, depending on the accuracy requirements of a particular machine and control system, selected corrective signals can be supplied at predetermined increments to compensate for a known rate of thermal distortion.

Irrespective of the extent of thermal distortion, a plurality of successive individual corrective signals provides a cumulative correction signal compensating for the pre-predetermined expansion occurring during the the total distance traveled. In the absence of a compensating signal, both the individual and cumulative errors due to thermal longitudinal expansion such as that described would usually far exceed the accuracy requirements of a particular machine tool and cooperating numerical control system.

During machine operation, a variety of different conditions can cause a predetermined increase in operating temperature with a resulting longitudinal expansion of the frame 12 and measuring scale 30. For example, such an increase in temperature in the present case results principally from transmission mechanisms (not shown) mounted within the frame and connected in well-known manner to drive different machine elements including the elevating screw 22. With the various different mechanisms within the frame 12 activated, therefore, the actual degree of thermal expansion is determined first in order to ascertain the corrective compensating signals required.

The numerical control system schematically illustrated in FIG. 3 is of the well-known pulse counting type produced commercially by several different manufacturers and incorporating well-known digital techniques. As shown in FIG. 3, a signal modifiers or compensation control 57 is interconnected therein for operation to automatically supply corrective signals to compensate for predetermined longitudinal scale expansion irrespective of the direction of travel and thereby minimize errors. The signal modifier is connected to automatically supply corrective signal pulses at predetermined increments of travel, as determined by a position register 55.

To provide a reference control signal, a clock oscillator 58 is operative to produce a square wave signal at a rate of 250 kc. and transmitted via principal output conductors 60 and 62. Conductor 60 transmits the 250 kc. input signal to a reference counter 64 provided with a three decade counter (not shown) operative in known manner to convert each one thousand input signal clock pulses to one output count pulse. From the reference counter 64, therefore, a conductor 65 is connected to transmit a reference pulse train of 250 cycles per second to a discriminator 67. An output error signal from the discriminator 67 is transmitted via a conductor 68 to selectively actuate the servomotor 26 for controlling movement of the worktable 16.

For selectively effecting operation of the servomotor 26, and depending upon the controlling input signal via a conductor 70 from a wave shaper 71, the discriminator 67 operates in known manner to provide three different types of servo control signals. For example, with the input reference control signal along a conductor 70 to the discriminator 67 in synchronism with the reference signal along the conductor 65 connected thereto, the output command signal along conductor 68 maintains the servomotor 26 at a dynamic standstill, i.e., there is no command signal to effect workable movement in either direction. With the input command signal along conductor 70 leading the reference signal along conductor 65, the discriminator 67 provides a phase advance signal along conductor 68 to actuate the servomotor 26 for moving the worktable 16 in a rightward (or downward) direction. Conversely, with the command signal along conductor 70 lagging the reference signal along conductor 65, the discriminator 67 provides a phase retardation signal along the conductor 68 for actuating the servomotor 26 to move the worktable 16 in a leftward (or downward) direction.

From the clock oscillator 58, the conductors 60 and 62 are operative to transmit a digitally pulsed signal to a command phase counter 74. As is known, a three decade counter (not shown) is provided in the command phase counter for operation to count down the pulsed input control signal by a factor of 1000 in a manner similar to the reference counter 64. In the absence of X axis command signals from the data input and system control 76, clock pulses from the conductor 62 are directly converted er (not shown) that functions in response to tape conductor 77 in synchronism with the reference signal via conductor 65, as hereinbefore explained. However, the command phase counter 74 differs from the reference counter 64 in being provided with a variable phase counter (not shown) that functions in response to tape controlled input signals for providing either leading a lagging output command signal via the line 77 to activate a controller 78; the latter being connected via line 82 to actuate the transducer bridge circuits 43.

From the command phase counter 74, as schematically shown in FIG. 3, one phase supply signal normally in synchronism with the phase of the clock reference signal is transmitted via a conductor 77A, providing a relatively fixed phase supply, and via a conductor 82A to the bridge circuits 43 connected to energize the windings 41 of the sensing head 34. At this same time, the command phase counter 74 is connected via a conductor 77B, to provide a 90° displaced phase supply, and via conductor 82B to the bridge circuits 43 for energizing the windings 42 of the sensing head 34. During operation, the 90° phase displaced signals are continuously transmitted to the sensing head windings 41 and 42 irrespective of the operating mode of the command signals, i.e., whether the servomotor 26 is dynamically braked against movement or whether a directional command signal is being supplied in response to commands from the data input effecting worktable movement. With the output command signals along conductors 77A and 77B spaced in quadrature, the command phase counter 74 operates to provide either leading or lagging phase change signals therealong with respect to the reference signal along conductor 65. For simplicity in the drawings, the line 77 is schematically representative of the output command signals from the command phase counter 74 and is considered equivalent to the separately indicated dotted conductors 77A and 77B that simultaneously transmit 90° phase displaced signals. Command for movement is determined by the difference in phase between the reference signal pulses along conductor 65 and the command pulses transmitted from the command phase counter 74 to energize the windings 41 and 42 of the sensing head 34.

Actually, a phase difference of 360° corresponds to a distance of one-tenth (.1) of an inch along the X axis. Thus, during servo effected movement of the worktable, the command phase rotates through 360° corresponding to movement of one circular pin diameter relative to the sensing head. Likewise, during servo movement, the phase changes linearly as the coils 41 and 42 of the sensing head 34 are moved relative to the circular pins 38 of the cooperating transducer scale 30. Consequently, phase controlling output signals from the transducer bridge circuits 43 are transmitted via a conductor 88 to a preamplifier and filter 89, and thence via a line 91 to the wave shaper 71 where they are reformed into a square wave signal. The output signal from the bridge circuits 43 is in phase leading or lagging relationship relative to the reference signal along conductor 65 or in synchronism therewith as hereinbefore explained.

For effecting worktable movement, command signals are supplied by the data input system 76 provided with the usual reader and control tape (not shown). Digital control signals are transmitted therefrom by one line 94 to a positional command register 95 and by another line 96 to a velocity control 98. The number of signal pulses along the conductor 94 operates to preset the command register 95 for effecting the required movement to the next desired position. At the same time, rate control signals along the conductor 96 operate the velocity control 98 for predeterminately controlling the frequency of the position determining signal pulses. Each signal pulse represents a .0001 inch increment of travel; thus 10,000 signal pulses would equal one inch of travel. It will be apparent that the extent of movement is commensurate with the number of signal pulses, and the velocity in moving the required distance with the frequency of the positional command pulses. From the velocity control 98, signals are transmitted via conductors 102 and 103 respectively connected to transmit rate control signals to a count control 105 and the signal modifier or compensation control 57 respectively. The signal via conductor 103 operates to maintain any corrective signal from the compensation control 57 synchronized in rate with the velocity commanded by the position commanding count control 105.

A comparison in the timing of pulses for controlling velocity is illustrated in FIG. 2. As thereshown, a clock pulse train 107 illustrates the repetitive pulses comprising the 250 kc. signal from the clock oscillator 58. Next, the clock pulse train 108 represents the comparative frequency of the maximum signal pulses from the velocity control 98 which is assumed to represent a maximum travel rate. The third clock pulse train 109 in FIG. 2 indicates a train of pulses controlled by the velocity control 98 for effecting a specific feed rate of 100 inches per minute. In all cases, the individual pulses swing or alternate between a logic zero 0, or 6 volts, and a logic one (1), or zero volts, as indicated in the drawings.

Command pulses for initiating movement in either selected direction are generated in the count control 105 in response to positional command signals from the data input control 76. Control pulses for effecting movement are determined by comparing the actual worktable position indicated by the position register 55 with the position required by the position command register 95. The position register 55 is schematically represented as being activated by the count control 105 via a left (up) counting conductor 111, or a right (down) counting conductor 112 in a manner to continuously indicate the existing position of the worktable 16. The position register 55 comprises a plurality of reversible counters operable to precisely indicate the position of the worktable throughout its full range of movement and with steering signals being supplied by conductors 111 or 112 from the count control. Each 0.0001 inch of command signals transmitted from the data input 76 to the command register 95 results in a corresponding signal pulse being transmitted from the count control 105 to the position register 55. During leftward (up) movement of the worktable 16, the position register 55 is counted up. Conversely, during rightward (down) movement of the worktable 16, the position register is counted down to positively indicate worktable position.

Between the command register 95 and the position register 55, there is interconnected a bit comparator 114 by means of lines 116 and 117 respectively. If the command register position is larger than the existing worktable position, as indicated by the position register 55, the comparator 114 provides a signal via a conductor 119 to actuate count control 105 for generating command pulses to move the worktable 16. For controlling position, the count control 105 generates the required signal pulses transmitted via a conductor 121 to normal count steering "gates" 122. From normal count "gates" 122, the signal continues via a conductor 124 to actuate the command phase counter 74 to skip certain pulses, thereby providing a phase retarded signal via conductor 77 and thus initiating leftward movement of the worktable 16. In the absence of signals for movement, the phase command counter 77 operates as hereinbefore explained, to provide output pulses along conductor 77 that are in phase with reference pulses along the reference conductor 65.

If the position required by the command register 95 is less than that indicated by the position register 55, the comparator 114 is operative to transmit a signal along a conductor 127 to actuate the count control 105 for generating signals to move the worktable 16. From the count control 105, the resulting command pulses are transmitted via a conductor 129 to double count steering gates 130. The steering gates 130 transmit signals via a conductor 132 to actuate the command phase counter 74 for producing double count signal pulses via the output conductor 77. This provides phase advance signals relative to the reference signal via the conductor 65 from the reference counter 64 for initiating rightward movement of the worktable 16.

During rightward movement of the worktable 16, the position register 55 is connected to provide successive individual signals via a conductor 134 to actuate a "right" compensation decoder 135. The individual corrective signals via the conductor 134 occur at successive one inch increments, plus any prior corrective signals already initiated by the position register 55. For example, a signal at eleven inches would occur at eleven inches plus ten prior signal pulses or increments. Since one inch equals 10,000 pulses, the "eleven" inch correction signal thus initiated occurs at 110,010 position indicating pulses during continuous rightward movement. This arrangement insures a cumulative correction proportionate to the predetermined elongation of the transducer scale 30 as hereinbefore explained. The single incremental signal via conductor 134 is coincidental with a single signal pulse transmitted from the count control 105 via the conductor 112 and a conductor 137 to the down scale compensation decoder 135.

From the down scale compensation decoder 135, signals are transmitted via conductors 138 and 139 to the double count steering gates 130 and the growth compensation control 57 respectively. For maintaining synchronism, the compensation control 57 is connected by conductor 62A to conductors extending to the clock oscillator 58, and by conductor 103 to velocity control 98. Further, the count 105 is connected by a conductor 142 connected to actuate compensation control 57 whenever a signal is transmitted thereto by conductor 139 for transmitting an additional rate modulated output signal to the double count steering gates 130 by conductor 143. The required additional signal pulse is then transmitted by line 127 to the command phase counter adding one additional signal pulse equivalent to 0.0001 of an inch in the output control signal therefrom.

In a similar manner, during leftward movement of the worktable 16, the position register 55 is connected to provide spaced apart individual signals via a conductor 145 to an up scale compensation decoder 147. The individual corrective signals via conductor 145 occur at successive one inch increments minus any prior corrective signal pulses previously initiated. With one inch being equal to 10,000 signal pulses, a correction signal at nine inches during leftward movement would thus occur at 109,990 position indicating pulses in the position register 55. At the same time, a signal pulse is transmitted from the count control 105 via conductor 111 and a conductor 148 to the "up scale" compensation decoder 147.

From the up scale compensation decoder 147, signals are then transmitted via a conductor 150 to the growth compensation control 57, and thence via a conductor 152 to normal count steering gates 122. As this happens, the normal count steering gates 122 transmit a signal via conductor 124 for actuating the command phase counter 74 to skip or subtract an additional pulse during leftward movement, thus providing an additional phase retarding signal.

Figure 4:
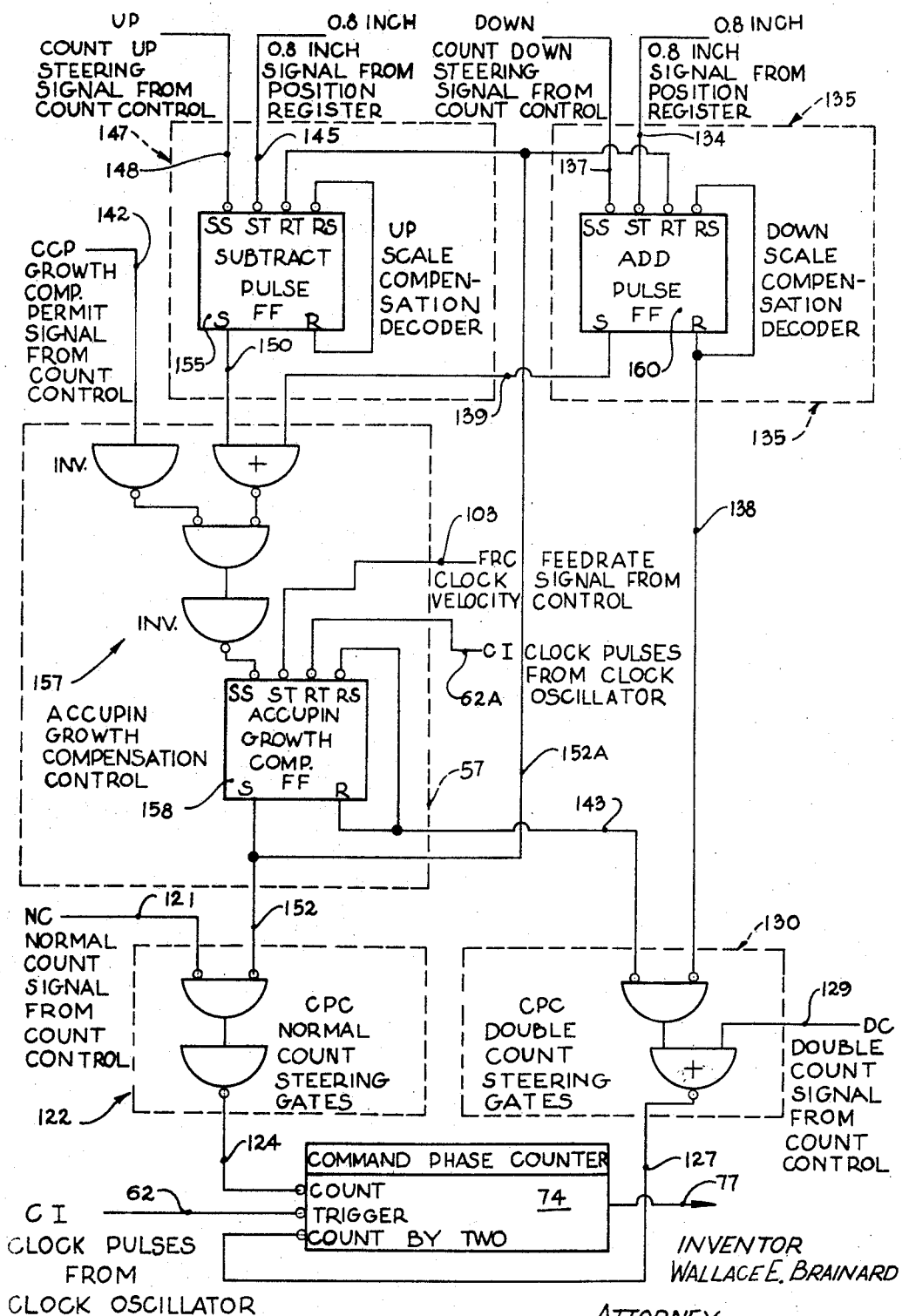
FIG. 4 is a fragmentary detailed view of the control circuit illustrating the arrangement for supplying corrective signals to compensate for longitudinal transducer elongation.

In FIG. 4, there is represented in fragmentary form a more detailed circuit for actuating the command phase counter 74 to provide the required phase controlled output signal via conductor 77 to effect relative movement of the workable 16. The "up scale" compensation decoder 147 comprises essentially a flip-flop 155 which is triggered upon the successive, spaced apart inch incremental signals via the "up count" conductor 145 from the position register 55. It will be noted that the actuating signal from the position register 55 is indicated as occurring at 0.8 of an inch for the first signal, and which would obviously be this amount plus added increments of one inch for each successive signal. From the flip-flop 155, the output signal pulse is transmitted via the conductor 150 to "gating" 157 comprising a part of the compensation control 57. The concomitant permit signal from the count control 103 is transmitted via the conductor 142 to the "gating" 157 which is then operative to provide an output for actuating a flip-flip 158 associated with the compensation control 57. Thereupon, the flip-flop 158 functions to transmit a set output signal to the normal count steering gates 122 for skipping an additional pulse during up or left movement. At the same time, conductor 152 is connected via branch conductor 152A to provide an input to the flip-flop 155, and a flip-flop 160, conditioning both for a change of state.

The flip-flop 160 is associated with the down scale compensation decoder 135 and is caused to change state upon receiving a signal pulse from the position register at successive spaced apart inch signals. A set signal from flip-flop 160 is then transmitted to the gating 157 which operates to actuate flip-flop 158. The resultant set signal via conductor 152, however, has no effect on the normal count steering gates 122 in the absence of signals thereto via conductor 121 which are transmitted only during up counting as hereinbefore explained. However, reset signals transmitted from flip-flops 160 and 158 via conductors 138 and 143 respectively function to acctuate the double count steering gates 130 for supplying an additional pulse to the command phase counter 74 for advancing the phase.

In FIG. 5 there is illustrated in fragmentary schematic form the compensating signal pulses provided by the position register in either direction of movement. The plus and minus compensating signals are represented in spaced apart increments corresponding to the total range of worktable movement of twenty inches.

Further, FIG. 7 is a chart graphically illustrating the effect of elongation of the transducer scale 30 relative to a line 163 that measures one inch or 10,000 command pulses when the scale 30 is not elongated. Due to thermally induced elongation, the one inch scale position is moved .0001 of an inch from the dotted vertical line 165 to the dotted vertical line 166. After elongation, in other words, application of 10,000 pulses during rightward movement would cause the transducer sensing head to move to a different position than required.

To actually achieve an inch of rightward movement, as indicated by the horizontal line 168, it is necessary to supply 10,001 command pulses for moving the sensing head to its corresponding required position along the elongated scale 30. In this case, it will be apparent that the sensing device must be moved from the vertical dotted line 169 rightwardly along the scale 30 to the dotted line 166 to achieve one inch of rightward movement. Conversely, one inch of movement in a leftward direction requires 9,999 command pulses as indicated by the horizontal line 170. In the latter case, it will be apparent that the sensing head is moved a measured position relative to the dotted line 165 on the elongated scale 30 to a position corresponding to the dotted line 169.

A command pulse timing chart in FIG. 8 schematically represents a comparison of various positional commands relative to the square wave reference signal 174 from the reference counter 64, FIG. 3. With the command phase counter 74 conditioned to provide a square wave command signal 176 in synchronism with the reference signal 174, a dynamic brake condition exists to maintain the worktable in its existing selected position. With the command phase counter 74 controlled by the double count steering gates 130, the square wave signal 177 in FIG. 8 provides additional signal pulses relative to the reference signal 174 for effecting rightward worktable movement.

With command counter 74 controlled by the normal count steering gates 122 to skip certain pulses, the resulting signal train 180 from the counter contains fewer command pulses than the reference signal 174. During the resulting leftward movement, a compensating signal results in the skipping or omission of another pulse as indicated at 181 in FIG. 8, and as hereinbefore explained.

Referring again to FIGS. 3 and 4, positional signals are transmitted from the count control 105 to the normal count steering gates 122 or the double count steering gates 130 for providing leftward or rightward output command signals respectively. As hereinbefore explained, the respective decoders 147 and 135 respectively actuate the compensation control 57 for modifying the output command signals from the steering gates 122 or 130. It will be readily apparent that the required compensating signals are applied directly to the directional command signals for actuating the command phase counter 74. Identical compensating results can be achieved adding or subtracting compensating pulses from the feedback control signal from the transducer sensing device 34. For example, compensating signals such as those derived from the decoders 135, 147 and compensation control 57, can be used to provide signals for modifying the positional feedback control signals from the transducer sensing device 34 to the discriminator 67. Thus, positional movement of the worktable 16 is suitably modified to compensate for thermal distortion of the positioning transducer irrespective of whether the compensating signals are transmitted to the command signals or the feedback control signals.

From the foregoing detailed explanation of the operation of the exemplifying thermal compensation system, it will appear that there has been provided a greatly improved and more accurate control adapted to compensate for any distortions in the transducer.

Although the illustrative embodiments of the invention have been described in considerable detail for the purpose of fully disclosing an operative structure and associated control system by means of which the invention may be practiced, it is to be understood that the particular apparatus herein described is intended to be illustrative only and that the various novel characteristics of the invention may be incorporated in other structural forms without departing from the spirit and scope of the invention as defined in the sub-joined claims.

The principles of this invention having now been fully explained in connection with the foregoing description, I hereby claim as my invention:

1. In a machine tool having a pair of members carried for relative movement;

drive means connected to effect movement of said movable members;

a positioning control system including a source of control pulses individually representative of uniform increments of movement and being operable to regulate the operation of said drive means to effect accurate positioning of said members;

a positioning transducer comprising an elongated scale secured to one of said members and adapted to change in length in accordance with changes in machine operating temperature, said transducer being provided with a sensing head carried by the other of said members in position to cooperate with said scale and operative to provide a feedback signal to said positioning control system for indicating the relative position therebetween;

a signal modifier being operative to add or subtract signal pulses to said positioning control system for modifying the control signal therefrom; and, control means being connected to effect operation of said signal modifier at predetermined fixed increments throughout the total range of relative movement between said members.

2. In a machine tool control system according to claim 1 wherein said control means includes;
an electrical position register operable to indicate the relative position between said members; and
an add and subtract decoder interconnected between said position register and said signal modifier in a manner to transmit predetermined spaced apart actuating signals from said position register during relative movement of said members.

3. In a machine tool according to claim 2 wherein said signal modifier operates to supply a uniform series of corrective signals, at uniformly repetitive increments of movement, to said positioning control system irrespective of the direction of movement of said members to compensate for a known rate of thermal distortion of said elongated scale.

4. In a machine tool control system having a pair of relatively movable members;
a position transducer comprising an elongated scale secured to one of said members and adapted to change in length in accordance with changes in machine operating temperature, said transducer being provided with a sensing head carried by the other of said members in position to cooperate with said scale for indicating the relative position between said members and being operative to provide a feedback signal;
a reference signal;
a discriminator connected to provide a directional command signal in accordance with the difference between the feedback signal from said transducer and said reference signal;
a servo drive connected to effect relative movement between said members in response to the directional command signal from said discriminator;
a signal modifier operative to automatically supply a uniform corrective signal to said control system for modifying the selected command signals therefrom in predetermined relation to changes in the length of said scale due to changes in machine operating temperature; and,
control means connected to indicate the relative position between said members and being predeterminately operative at uniformly repetitive increments of movement therebetween to effect operation of said signal modifier to supply a uniform series of corrective signals.

5. In a machine tool control system according to claim 4 wherein said control means includes;
a position register for indicating the relative position of said members; and,
an add and subtract decoder interconnected between said position register and said signal modifier in a manner to provide an add or subtract compensating signal during the one same direction of movement.

References Cited

UNITED STATES PATENTS

| | | |
|---|---|---|
| 2,988,681 | 6/1961 | Bower. |
| 3,010,063 | 11/1961 | Rhoades. |
| 3,218,532 | 11/1965 | Toscano. |
| 3,340,447 | 9/1967 | Macdonald. |
| 3,347,116 | 10/1967 | Anderson et al. |
| 3,393,588 | 7/1968 | Broome. |

THOMAS E. LYNCH, Primary Examiner

U.S. Cl. X.R.

90—13; 235—151.11; 318—162